United States Patent [19]
Gasser et al.

[11] 3,950,553
[45] Apr. 13, 1976

[54] PROCESS FOR PREPARING A SOLUBLE TEA PRODUCT

[75] Inventors: Rupert J. Gasser, Old Greenwich, Conn.; James G. Franklin; John D. Fraley, both of Marysville, Ohio

[73] Assignee: Societe d'Assistance Technique pour produits Nestle S.A., Lausanne, Switzerland

[22] Filed: June 10, 1974

[21] Appl. No.: 477,601

[52] U.S. Cl. ............... 426/262; 426/435; 426/597
[51] Int. Cl.² .......................................... A23F 3/00
[58] Field of Search ........... 426/193, 262, 270, 365, 426/366, 386, 49, 387, 435, 148, 597

[56] References Cited
UNITED STATES PATENTS

| | | | |
|---|---|---|---|
| 2,831,772 | 4/1958 | Herz | 426/365 |
| 3,151,985 | 10/1964 | Fobes | 426/365 |
| 3,163,539 | 12/1964 | Barch | 426/365 |

Primary Examiner—Frank W. Lutter
Assistant Examiner—Steven L. Weinstein
Attorney, Agent, or Firm—Watson Leavenworth Kelton & Taggart

[57] ABSTRACT

This invention relates to an improved process for the preparation of cold-water soluble tea products wherein tea tannins which have been partially oxidized to improve their solubility are contacted with native tea tannins. The admixture of oxidized and native tannins is permitted to equilibrate until the desired final color is obtained, and thereafter the unoxidized tannins are precipitated so as to leave a clear aqueous solution useful for the preparation of instant tea products.

16 Claims, No Drawings

PROCESS FOR PREPARING A SOLUBLE TEA PRODUCT

INTRODUCTION TO THE INVENTION

This invention relates to an improved process for preparing a soluble tea product and, more particularly, to the preparation of a powdered tea extract which is completely and readily soluble in cold water.

Another object of the present invention comprises the preparation of a cold-water soluble tea product which will yield substantially the same flavor as a fresh tea beverage.

A further object of the present invention comprises the provision of a simplified process for the production of cold-water soluble tea products which will yield essentially the same appearance and color as a fresh tea beverage.

During the production of tea products, substances of varying solubility in cold water are extracted from the tea leaves. One fraction of the extracted solids is readily soluble in cold water. A second fraction, referred to herein as the tea "tannins," is essentially insoluble in, and separable from, cold water. The constituents of this second fraction are not necessarily all tannins in a chemical sense, but they behave as tannins and are customarily and collectively referred to in the art as "tannins." Accordingly, one method of the prior art for producing cold-water soluble tea products comprises removing the second, tannin fraction from the cold-water soluble fraction; concentrating the cold-water soluble fraction; and drying it to particulate form. Pursuant to this practice, however, the insoluble fraction is discarded, thus leading to a substantial loss of normal, flavorful tea components.

One method for overcoming this loss of the tannin fraction of a tea product is set forth in U.S. Pat. No. 3,163,539 to Barch. In accordance with the disclosure of this patent, the normally cold-water insoluble tannin fraction of an aqueous tea extract is precipitated by chilling the extract. The precipitate is then subjected to oxidation under highly basic conditions sufficient to render the tannins soluble in cold water. Thereafter, the tannin fraction is acidified to its normal pH and utilized to reconstitute the original extract.

Incident to such cold-water solubilization of tannin fractions, however, substantial color development takes place. Thus, even under carefully controlled conditions of pH, temperature, heating time and oxygen concentration, the formation of darkly colored compounds in the tannin fraction imparts an unnatural and undesirable appearance to the eventual tea products containing these oxidatively solubilized tannins.

U.S. Pat. No. 3,151,985 to Fobes describes a means through which it is possible to restore the original tea color to beverages which contain oxidatively solubilized tannin constituents. In accordance with the process of such patent, the solubilized tannins are subjected to the bleaching action of, for example, hydrogen peroxide before they are employed to reconstitute the original tea extract. Although this added step achieves the desired appearance or color in beverages produced from its cold-water soluble tea product, substantial additional technical requirements attend such a process.

The present process avoids the prior art's highly basic oxidative conditions for solubilization of tannins. Additionally, it eliminates the need for the special bleaching and acidification steps which have been utilized to obtain desirable appearance and flavor in the eventual tea products.

In accordance with the present invention, tannin fractions precipitated by prior art techniques are subjected to oxidative, cold-water solubilization under conditions of pH which are initially only mildly basic and which become more acidic, incident to oxidation of the tannins. Thereafter, and without the need for further pH adjustment, the oxidized fraction is combined with a second fraction of unoxidized tannins. The two tannin fractions — i.e. oxidized and native — are then permitted to equilibrate in aqueous medium. During the course of this tempering period, there occurs a decolorization of the oxidized, darkened tannins.

After the requisite degree of decolorization has been reached, the unoxidized tannins are removed. This step may be accomplished through the same means utilized to precipitate the original tannin fraction from the first tea extract, e.g. by chilling the solution so as to precipitate cold-water insoluble, unoxidized tannins.

After separation of the precipitated tannins, the resultant solution, which comprises the oxidized tannin fraction of the first tea extract, may be utilized in producing a completely cold-water soluble tea product.

DESCRIPTION OF THE INVENTION

In accordance with this invention, hot water extracts of tea leaf are prepared containing tannin constituents insoluble in cold water, as well as other constituents soluble in both hot and cold water. Such extracts may be prepared by conventional techniques. Exemplary of these techniques are the multi-stage counter-current and slurry extractions, each of which normally involves leaching of tea leaves with water at a temperature of from about 60° to 120°C.

In addition to the use of hot water as the extraction liquid, various aqueous solutions containing tea constituents may be so utilized. For example, suitable extracts may be produced with aqueous, solubilized tannin solutions as are described hereinafter. Depending upon the particular extraction technique employed, the resultant extract will usually range from about 1 to 10% solids by weight. Preferably, the hot tea extract is then adjusted to a standard concentration so as to simplify its further treatment. Ordinarily, a standard of from about 5 to 15%, most preferably about 8%, by weight of total solids is preferred.

As utilized herein, "hot" or "hot water" refers to a temperature between about 60° and 120°C, whereas "cold" or "cold water" refers to a temperature between about 0° and 15°C.

Additionally, it is desirable that any volatiles of the tea extract be removed and preserved. These important flavor constituents of the tea extract are unusually susceptible to reaction or loss during processing of the tea extract and it is therefore advantageous to minimize their exposure to adverse conditions. Thus, for example, even prior to standardization of the concentration of the tea extract, these constituents should desirably be isolated, for example, by stripping them from the extract with steam at a temperature of from about 80° to 120°C, collecting the steam laden with volatile constituents and condensing and cooling the resultant solution to obtain a stable isolate of these important flavorants.

Thereafter, the removal of the cold-water insoluble fraction of the tea extract may be performed. This tannin fraction, which constitutes from about 15 to 35% of the total tea solids, is ordinarily precipitated from solution through chilling to a temperature between about 15° and 0°C, preferably about 10°C. Separation of the tannins from the aqueous supernatant of soluble tea solids may then be accomplished through various techniques well-known in the art. Most preferably, the separation is accomplished by centrifuging the chilled slurry and removing the insolubles. These insolubles are then desirably washed with water, preferably at a temperature less than about 15°C, suitably about 10°C. The wash liquid will remove any entrained solubles from the precipitate, and may be recombined with the supernatant from the precipitation step.

The washed cake of tannin insolubles is then dispersed, or dissolved, ordinarily in hot water. Again, it is desirable that the concentration of the tannins to be treated be standardized. Consequently, it is preferred that sufficient water be utilized to obtain a medium having from about 5 to 15% solids, most preferably about 8% by weight of solids.

This aqueous medium must be rendered basic in preparation for oxidation of the tannins. Accordingly, sufficient alkali — including, for example, sodium hydroxide, potassium hydroxide and/or ammonium hydroxide — should be added so as to raise the pH, preferably to from about 7.0 to about 9.0, most preferably to about 8. Although higher degrees of alkalinity may be utilized, we prefer to avoid such higher pH levels in order to obviate the need for adjustment of pH in subsequent steps.

Oxidation of the tannins may be controlled through the rate of addition of the oxidizing agent to the alkaline medium. Suitable oxidizing agents are known in the art and include hydrogen peroxide, ozone, and/or oxygen. Most preferably, oxygen is employed as the present oxidizing agent. Air may also be used. The amount added to the tannin solution is suitably at least 100 liters (S.T.P.), preferably 200–400 liters, of oxygen per kilogram of tannin solids. Where other oxidizing agents are utilized, equivalent amounts thereof should be added to the medium.

The degree of oxidation of tannins is readily observable inasmuch as, coincident therewith, the pH of the medium declines, the color of the tannins darkens and the desired solubility is achieved. Therefore, the amount of oxidizing agent and the rate and period of reaction necessary for optimum results are determinable from monitoring these characteristics. Ordinarily, the reaction should be permitted to continue for from about 10 minutes to about 3 hours, depending upon the reaction pressure, degree of agitation and concentration of the reactants. Additionally, the reaction medium should be maintained at a temperature of at least 50°C, preferably between about 60° and 120°C. During the course of the oxidative reaction, heat should be removed from the reaction medium in order to maintain the temperature within the desired limits. Finally, the reaction should be stopped — for example, by removing the tannins from the oxidizing environment — when the tannins have reached the desired degree of solubility.

It is also possible, during the course of the oxidative reaction, to control the rate and degree of reaction through intermittent addition of alkali. As noted previously, the medium becomes progressively more acidic during the course of oxidation, or between incremental additions of alkali. Regardless of whether the alkali is added in one or several increments, however, it has been discovered that the desired degree of oxidation can be reached by permitting the pH of the medium, after the last increment of alkali, to fall to within the range of from about 5.0 to 8.0, preferably about 5.0 to 6.0, before stopping the reaction. Normally, the total amount of added alkali should be equal to the amount which — if all added initially to the dispersion or solution — would raise its pH to within the previously indicated range of between about 7.0 and about 9.0.

These pH values sufficiently approximate those of natural tea extracts as to enable recombination of the oxidized tannins with other tea solubles to produce a tea product which does not require additional pH adustment. Accordingly, the desired natural degree of acidity associated with freshly brewed tea beverages is obtained without addition of acid.

After the tannin solution has been subjected to sufficient oxidation to render its tannin constituents soluble in cold water, it will exhibit — particularly in dried form — a considerably darkened appearance. It is therefore necessary to treat the solution further if the tannins are to be lightened in color. This lightening or restoration may be accomplished, in accordance with this invention, by combining the solution of oxidized tannins with native — i.e. unoxidized — tannins.

Tannin decolorization may be accomplished in any number of ways, for example, through admixture of the oxidized tannin solution with an appropriate quantity of native tannins previously separated from a second extract of tea. Such a quantity may be obtained after chilling an aqueous extract of tea leaves in the manner previously described, so as to produce a second fraction of native tannins — similar in composition and amount to that which is oxidatively solubilized — suitable for use as a decolorizing agent in accordance with the present invention.

Preferably, however, the oxidized tannin solution is admixed with a whole tea extract — i.e. a fresh extract containing substantially all its naturally cold-water soluble and insoluble fractions — and most preferably, with a whole tea extract from which the volatiles had been removed for preservation. Regardless of the means of admixture, however, the oxidized and unoxidized tannins should desirably be present in approximately equivalent amounts. Such equivalent amounts are most conveniently achieved by utilizing an original and second tea extract — or tannin fractions separated therefrom — of substantially identical solids concentrations.

Incident to this step which permits the intimate contact of oxidized and darkened tannins with native tannins, there occurs a gradual decolorization of the solubilized, oxidized tannins. This decolorization should be permitted to occur over a period of time sufficient to allow reversion to the native tannin color, usually at least five minutes, more desirably from about ten minutes to one hour. Decolorization may be performed over a wide range of temperatures; however, the native tannins should ordinarily be retained in solution. Thus a temperature between about 50° to 90°C is preferred.

After decolorization has been achieved, the cold-water soluble tannins of the solution should be separated from the remaining, less soluble tannins. This step corresponds essentially to the isolation of oxidized tannins from native tannins, respectively. Again, the separation is most advantageously achieved through chilling the composite tannin solution, most preferably to a temperature of less than about 15°C, preferably about 10°C. The tannin fraction precipitated as a result of such chilling may then be rendered cold-water soluble in accordance with the steps of oxidation and decolorization already set forth above, whereas the solubilized tannins — i.e. those remaining in the supernatant — are now in condition appropriate for use in providing a fully flavored, cold-water soluble tea product having natural color.

Where the decolorization has been performed in accordance with a preferred embodiment of the present invention — viz. through combination of the oxidized tannin solution with a whole hot water extract of tea (with or without volatiles) — the steps of decolorization and subsequent removal of cold-water insoluble tannins corresponds to a substitution of the solubilized tannins derived from one extract, for the native less-soluble tannin fraction of the whole tea extract employed for decolorization. Accordingly, this combination of steps results in the production of a reconstituted tea extract containing substantially all the solubles necessary for the production of a full bodied, naturally colored, cold-water soluble beverage. Incident to this embodiment, still another advantage of the present invention becomes apparent. Thus the hazy appearance of tea extracts and beverages which have been produced in accordance with techniques such as slurry extraction is unexpectedly resolved. This haziness, which is apparently due to the presence of a stable colloid, cannot ordinarily be removed by mechanical treatment or chilling. Thus it is not usually considered to be caused by tannin constituents. Yet, the present decolorization utilizing whole, hazy extracts also causes breakage of the colloid so as to permit the eventual production of beverages which are completely clear and therefore highly desirable.

In the alternative, an isolate of natural tannins may be utilized to decolorize the oxidized tannins. In this instance, however, it remains necessary after removal of natural tannins to combine the resultant supernatant of oxidized tannins with an appropriate solution containing the normally cold-water soluble fraction of extractable tea solids. This combination is ordinarily made in a proportion such that the reconstituted extract has approximately the same ratio of solubles to tannins as is found in normal tea extracts.

Where desired, however, the reconstitution may be performed so as to yield extracts in which the normal ratio between tannins and other solubles is altered. In this manner, variation in the aroma and flavor of the eventual tea beverage may be effected so as to suit particular consumer desires.

Once a reconstituted extract of both the naturally occurring, cold-water soluble fraction of a tea extract and oxidized, decolorized cold-water soluble tannins has been obtained, subsequent processing for the production of a tea product may be performed in accordance with the prior art techniques. Eventually, a tea powder is ordinarily produced. Accordingly, the reconstituted extract may be dried, for example, by spray drying. Alternatively, the reconstituted extract may be frozen and then freeze-dried.

It is additionally desirable, prior to drying, to concentrate the reconstituted extract to facilitate the drying step. Concentration may also be performed by means well-known in the prior art including, for example, freeze concentration or vacuum evaporation of the reconstituted extract. It is most preferred that concentration be performed so as to obtain a solution having a solids concentration within the range of from about 20 to 60%, the particular optimum concentration being dependent upon the drying technique actually utilized.

Finally, where the volatiles of the hot aqueous tea extracts have been removed to ensure their preservation during the subsequent processing stages of the present invention, these volatiles are preferably added to the concentrated extract preparatory to final drying. Most preferably, the volatiles should be recombined only immediately prior to final drying. In this manner, products are obtained which yield flavors virtually indistinguishable from those of freshly brewed tea beverages, with the added advantage, that they exhibit essentially complete and ready cold-water solubility.

In order more clearly to describe the nature of the present invention, specific examples are hereinafter described. It should be understood, however, that this is done solely by way of illustration and thus is not limitative of the ambit of the appended claims. In the examples and throughout the specification, percentages are intended to refer to percent by weight, unless otherwise specified.

EXAMPLE NO. 1

2500 kilograms of tea extract are obtained from a continuous counterflow column. The extract is at a concentration of about 4% total solids and a temperature of 80°C. This extract is then stripped with 4% by weight of steam at a temperature of 100°C to remove volatiles. The volatiles are condensed and cooled as a separate isolate, while the stripped extract is concentrated to about 10% total solids by vacuum evaporation performed at 700 mm of Hg and 80°C.

The concentrated tea extract is then cooled to a temperature of 10°C and centrifuged. Thirty-five kilograms of raw tannin solids are thereby separated from the extract. These solids are dispersed in 315 kilograms of water, and the resultant slurry is adjusted to a pH of 8.5 with sodium hydroxide.

The alkalized tannins are then subjected to oxidation at a temperature of 80°C for 30 minutes. During such time, 7,000 liters of oxygen are passed through the extract. Upon termination of the reaction, the pH of the tannin solution is 6.0. The oxidatively solubilized tannins are then added to a second 1,000 kilograms of unclarified, stripped tea extract having a solids concentration of 10%. The resultant mixture is held under agitation at a temperature of 70°C for 20 minutes. The mixture is then cooled to 10°C and centrifuged, again removing 35 kilograms of unoxidized tannin solids.

The supernatant obtained pursuant to centrifugation is again subjected to vacuum evaporation, this time until it reaches a solids concentration of 45%. To this highly concentrated extract is added the original volatiles isolate, and the resultant solution (at 43% solids) is then spray dried to obtain a dry powder of tea.

The tea powder is similar in color and appearance to those commercially available. Upon addition to cold water to produce a beverage, the powder is readily soluble and yields a clear appearance and color, which, again, are similar to those of commercially available beverages.

EXAMPLE NO. 2

The process of Example 1 is repeated with the exception that the resultant solution of oxidized tannins is not admixed with the second tea extract as is done in that example. Instead, the second tea extract is separately cooled to 10°C and centrifuged to remove 35 kilograms of tannin precipitate. This precipitate is then added to the solution of oxidized tannins and maintained therewith under agitation for 30 minutes at a temperature of 50°C.

Thereafter, the admixture is cooled to 10°C and centrifuged to remove the 35 kilograms of native tannin solids derived from the second extract. The remaining solution containing oxidized tannins is combined with the natively cold-water soluble portion of the second extract. Then the reconstituted extract is further concentrated, recombined with the isolated volatiles, and dried as in Example 1 to produce a powder having a light appearance and ready and complete solubility in cold water.

EXAMPLE NO. 3

The process of Example 1 is repeated with the exception that the second 1,000 kilograms of unclarified tea extract are produced by a slurry extraction technique. Such extract is characterized by a hazy appearance (which is most apparent after removal of low solubility tannins) in contrast to the clarity of the second tea extract of Example 1. Subsequent to decolorization and centrifugal removal of natural tannin solids, however, the extract is observed to exhibit a completely clear appearance.

Further dehydration of the extract to a powder yields a product having, on reconstitution with cold water, the same appearance and characteristics as described in Example 1.

We claim:

1. A process for producing a tea product comprising:
   a. chilling a hot water extract of tea leaves to a temperature sufficient to precipitate unoxidized tannins therefrom, and separating the precipitated unoxidized tannins from the supernatant;
   b. dispersing said tannins in an aqueous medium at a pH of from about 7.0 to about 9.0;
   c. subjecting said medium containing said dispersed tannins to oxidation at a temperature of at least 50°C for a period of time sufficient to render the tannins soluble in cold water and to reduce the pH of said medium to between about 5.0 and 8.0;
   d. contacting said medium containing oxidized tannins with an agent comprising unoxidized tannins, said oxidized and unoxidized tannins being contacted in approximately equivalent amounts for a period of time sufficient to decolorize said oxidized tannins; and
   e. chilling the resultant aqueous tannin composition to a temperature sufficient to precipitate unoxidized tannins and separating a solution of decolorized, cold-water soluble tannins from the resultant precipitate.

2. A process according to claim 1, which includes the further steps of reconstituting the decolorized, cold-water soluble tannins of step (e) with an essentially tannin-free solution having essentially the same composition as the supernatant of step (a) and drying the resultant reconstituted solution to form a powdered tea product.

3. A process according to claim 2, wherein the decolorized, cold-water soluble tannins of step (e) are reconstituted with the supernatant obtained in step (a) and the resultant solution is dried to form a powdered tea product.

4. A process according to claim 2, wherein tea volatiles are separated from the hot water extract prior to step (a), and said volatiles are incorporated into the reconstituted solution prior to drying.

5. A process according to claim 1, wherein the agent of step (d) comprises a hot-water extract of tea leaves of substantially the same concentration as that of step (a), and the solution obtained in step (e) is dried to form a powdered tea product.

6. A process according to claim 5, wherein the agent of step (d) is characterized by the presence of a haze-imparting, stable tea colloid.

7. A process according to claim 1, wherein the pH of the medium of step (c) is reduced to between about 5.0 and 6.0.

8. A process according to claim 1, wherein the chilling of step (a) reduces the temperature of the extract to within the range of from 15° to 0°C.

9. A process according to claim 1, wherein the extract of step (a) contains from about 5 to 15% tea solids by weight.

10. A process according to claim 1, wherein the medium of step (c) contains from about 5 to 15% tannin solids by weight.

11. A process according to claim 1, wherein the oxidation of step (c) is performed for from 10 minutes to 3 hours and the terminal pH of the resultant solution of said step is between about 5.0 and 6.0.

12. A process according to claim 1, wherein the decolorization of step (d) is performed for from 10 minutes to 1 hour.

13. A process according to claim 1, wherein the decolorization of step (d) is performed at a temperature of from about 50° to 90°C.

14. A process according to claim 1, wherein tea volatiles are removed from the hot water extract of tea leaves prior to the chilling of step (a).

15. A process according to claim 14, wherein the solution of decolorized, cold-water soluble tannins resultant from step (e) is reconstituted with an aqueous solution containing tea volatiles.

16. A process according to claim 1, wherein the oxidation of step (c) is performed at a temperature between about 60° and 120°C.

* * * * *